Feb. 15, 1949. J. E. HOOPER 2,461,736
COFFEE FILTER
Filed March 25, 1946
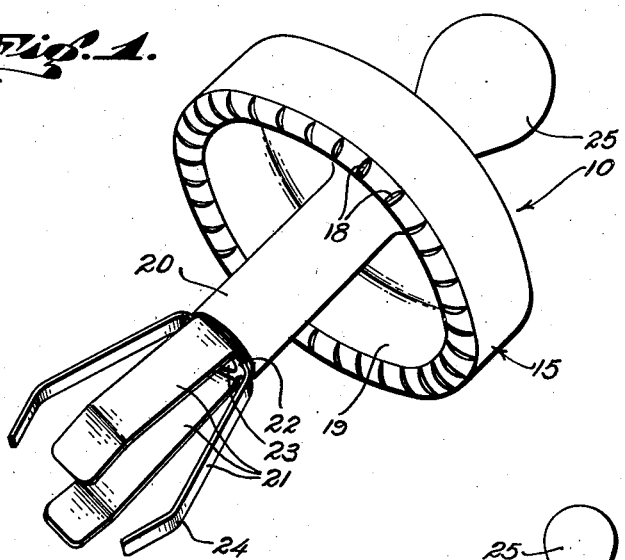
Fig. 1.
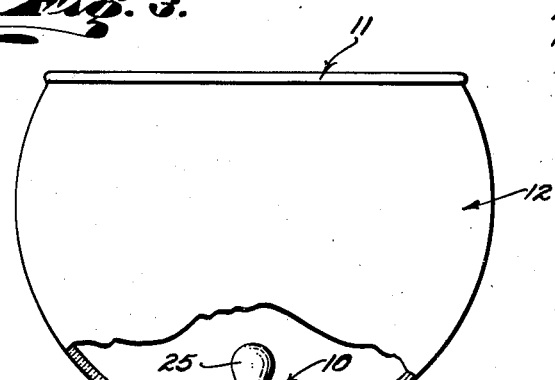
Fig. 3.
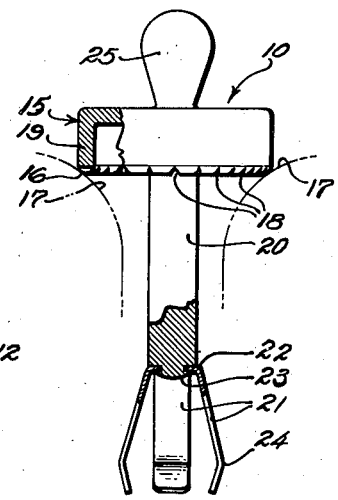
Fig. 2.
JOHN E. HOOPER
INVENTOR.
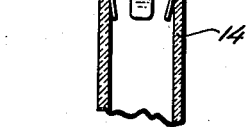
BY
ATTORNEY Patented Feb. 15, 1949

2,461,736

UNITED STATES PATENT OFFICE 2,461,736

COFFEE FILTER

John E. Hooper, Burbank, Calif.

Application March 25, 1946, Serial No. 656,954

3 Claims. (Cl. 210—162)

This invention has to do with improvements in coffee filters of the type adapted for use in coffee makers of the dual section type comprising a lower container and an upper receptacle in the form of an open bowl having a curved convergent neck continuing in a tubular stem depending within the container.

Heretofore, various types and forms of such filters have been proposed and used. In general, all types have one or more various objectionable characteristics, such as being subject to easy breakage, inability to properly filter the coffee particles in their various degrees of fineness, and incapability of being easily and thoroughly cleaned.

My major object is to provide an improved and novel form of device characterized by its simple and undestructible form, its capacity for perfectly filtering the coffee, and ability to be thoroughly cleaned by casual washing. Also the invention aims to provide a filter capable of simple and low cost manufacture, which can be used indefinitely without requiring any particular care in its handling.

In accordance with the invention, the filter comprises a body, preferably of light weight non-corrosive metal, having an annular surface for engagement within the curved neck of the receptacle and containing properly sized and circularly spaced small filter recesses. Particularly the invention contemplates curving the recessed body surface oppositely from the receptacle neck surface so that the two surfaces have substantially single point or line contact.

Provision is made for securely anchoring the body against upward displacement, by frictionally retaining a depending stem or rod portion of the body within the receptacle stem. To facilitate insertion and removal of the filter within the receptacle, the body carries an upwardly projecting handle, preferably in the form of a knob cast integrally with the larger diameter flange head of the body.

All the various features and objects of the invention, as well as the details of a preferred embodiment thereof will be more fully understood from the following description of the accompanying drawing, in which:

Fig. 1 is a perspective view of the filter;

Fig. 2 is a side elevation showing the spring attachment in cross-section; and

Fig. 3 is a view showing the filter positioned within the coffee receptacle.

Referring first to Fig. 3, the filter device, generally indicated at 10, is shown to be positioned within the glass receptacle 11 which, as will be understood, constitutes the upper section of the usual dual chamber coffee maker, the entire assembly of which comprises a lower heating vessel, not shown, within the top of which the receptacle 11 is inserted so that heating followed by cooling of the liquid in the bottom container, causes the liquid to be displaced into and out of the top receptacle. The latter has an enlarged bowl portion 12 of appropriate shape, and a curved neck 13 converging into the depending tubular stem 14.

In its preferred form, the filter unit 10 comprises a body including a large diameter head or flange portion 15 having a diameter such that its bottom edge surface 16 rests upon the curved surface 17 of the receptacle neck 13, at substantially the position illustrated in Fig. 3. It will be noted that the body surface 16 is curved oppositely from the neck surface curvature, so that the two surfaces have only substantially single point or line contact. The curved head surface 16 contains a series of circularly spaced recesses 18, preferably V-shaped as illustrated, and of such size as to permit adequately rapid flow of liquid therethrough, while effectively preventing passage of any consequential quantity of coffee particles having a size objectionable in the brewed coffee ultimately received in the bottom container.

As illustrative of certain dimensional relationships which have been found to give excellent results, the depending rim 19 of the head may have an average thickness somewhat less than $\frac{3}{16}$ inch, with the bottom surface 16 circularly curved at a corresponding radius. The recesses 18 have the form of V-shaped recesses extending horizontally through the curved surface 16, the recesses having a bottom or maximum width of around 0.032 inch, a depth of about 0.0417 inch, and an angularity between the divergent sides, of about 42°. Giving the head 15 a diameter of about 1.5 inches, proper filtering and liquid passing capacity has been obtained using about 36 uniformly spaced V-grooves having the stated dimensions.

The body includes an integral depending stem or rod 20 carrying a suitable spring means for frictionally engaging the wall of the receptacle stem 14. The friction grip may be established by a plurality of spring fingers 21 branching from a common center 22 attached to the lower end of the stem by the upset head 23. The bottom end portions of the spring angle inwardly from substantially single point of contact at 24 with the receptacle. By the described spring finger arrangement, the filter body is anchored against upward displacement to maintain the surfaces 16 and 17 in engagement at all times, and against pressure of the liquid being displaced from the bottom container upwardly into the top receptacle 12. A top projection, preferably in the form of a knob 25, is formed integrally with the head 15 to facilitate the filter insertion in and removal from the receptacle.

As will be understood from the foregoing, water boiling in the lower container is displaced upwardly through the stem 14 and recesses 18 into the receptacle 12 at a proper rate permitted by the size and number of the filtering recesses. Afterward, as the coffee brew drains down through the stem, passage of the coffee particles is arrested at the filter openings while at the same time the liquid is permitted rapid passage therethrough.

I claim:

1. A coffee filter for reception in a receptacle including a bowl having a bottom neck with a symmetrically curved side wall and a hollow stem depending therefrom, comprising a body having an annular downwardly facing surface engageable with said curved side wall of the neck in circular line contact and containing small circularly spaced filter recesses intersecting said line of contact, said surface being curved upwardly at each side of said line of contact, and means receivable within said stem for holding the body against upward displacement.

2. A coffee filter for reception in a receptacle including a bowl having a bottom neck with a symmetrically curved side wall and a hollow stem depending therefrom, comprising a body having a depending circular flange head and a stem depending within the receptacle stem, said head having a circular downwardly facing surface engageable with said curved side wall of the neck in circular line contact and containing small circularly spaced recesses, said surface being curved upwardly at each side of said line of contact, and means on said body stem for engaging said receptacle stem to anchor said filter body therein.

3. A coffee filter for reception in a receptacle including a bowl having a bottom neck with a symmetrically curved side wall and a hollow stem depending therefrom, comprising a body having a depending circular flange head and a stem depending within the receptacle stem, said head having a circular downwardly facing surface engageable with said curved side wall of the neck in circular line contact, said surface being curved upwardly at each side of said line of contact and containing small circularly spaced recesses, a handle projecting upwardly from said head, and yielding means on said body stem for engaging said receptacle stem to anchor said filter body therein.

JOHN E. HOOPER.

REFERENCES CITED

The following references are of record in the file of this patent:

UNITED STATES PATENTS

| Number | Name | Date |
|---|---|---|
| 755,967 | Thiele | Mar. 29, 1904 |
| 1,006,886 | Spitzig | Oct. 24, 1911 |
| 2,108,684 | Lynch | Feb. 15, 1938 |
| 2,190,965 | Wood | Feb. 20, 1940 |
| 2,211,414 | Francis | Aug. 13, 1940 |
| 2,289,498 | Hons, Jr. | July 14, 1942 |
| 2,366,951 | Aycock | Jan. 9, 1945 |
| 2,370,674 | Lucia | Mar. 6, 1945 |
| 2,390,269 | Peterson | Dec. 4, 1945 |
| 2,392,656 | Foster | Jan. 8, 1946 |